(12) United States Patent
Lilleheden et al.

(10) Patent No.: US 7,726,253 B2
(45) Date of Patent: Jun. 1, 2010

(54) FIBRE MAT AND A METHOD OF MANUFACTURING A FIBRE MAT

(75) Inventors: Lars Tilsted Lilleheden, Kolding (DK); Torben Krogsdal Jacobsen, Lunderskov (DK); Raymond Johnsen, Aalesund (NO)

(73) Assignee: LM Glasfiber A/S, Lunderskov (DK)

( * ) Notice: Subject to any disclaimer, the term of this patent is extended or adjusted under 35 U.S.C. 154(b) by 863 days.

(21) Appl. No.: 10/586,820

(22) PCT Filed: Jan. 14, 2005

(86) PCT No.: PCT/DK2005/000019

§ 371 (c)(1),
(2), (4) Date: Oct. 18, 2006

(87) PCT Pub. No.: WO2005/071152

PCT Pub. Date: Aug. 4, 2005

(65) Prior Publication Data

US 2007/0193491 A1     Aug. 23, 2007

(30) Foreign Application Priority Data

Jan. 26, 2004 (DK) .............................. 200400095
Sep. 22, 2004 (DK) .............................. 200401440

(51) Int. Cl.
*D05B 3/12* (2006.01)
*B32B 9/00* (2006.01)

(52) U.S. Cl. ................... 112/475.08; 112/412; 428/102

(58) Field of Classification Search ................. 112/412, 112/426, 162, 197, 475.01, 475.08, 475.17; 428/102
See application file for complete search history.

(56) References Cited

U.S. PATENT DOCUMENTS

| | | | | |
|---|---|---|---|---|
| 1,204,046 A | * | 11/1916 | McLoughlin | 112/426 |
| 2,518,407 A | * | 8/1950 | Weinberg | 66/193 |
| 3,274,806 A | * | 9/1966 | Duhl | 66/192 |
| 3,405,598 A | * | 10/1968 | Iwai | 87/7 |
| 3,481,245 A | * | 12/1969 | Kamitani | 87/6 |
| 3,567,565 A | * | 3/1971 | Jones et al. | 428/102 |
| 4,183,993 A | * | 1/1980 | Benstead et al. | 442/314 |
| 4,671,988 A | * | 6/1987 | Dowell et al. | 442/306 |

* cited by examiner

*Primary Examiner*—Ismael Izaguirre
(74) *Attorney, Agent, or Firm*—Day Pitney LLP

(57) ABSTRACT

The invention relates to a method of manufacturing a fiber mat adapted for use in the manufacture of a fiber-reinforced device, said fiber mat comprising at least two essentially longitudinally extending and parallel batches of fibers. Novel aspects of the method according to the invention involves that the method comprises that the batches are joined by holder means that span above or below each batch, whereby the holder means impart an influence to each batch which is essentially symmetrical about an axis situated longitudinally between the batches. A symmetrical influence about an axis longitudinally between the batches accomplishes that influence from one side is matched by influence from an opposite side. Hereby it is prevented that the batch will undulate. Simultaneously the batches are clearly separated, whereby resin is more easily conducted longitudinally of the batches.

28 Claims, 10 Drawing Sheets

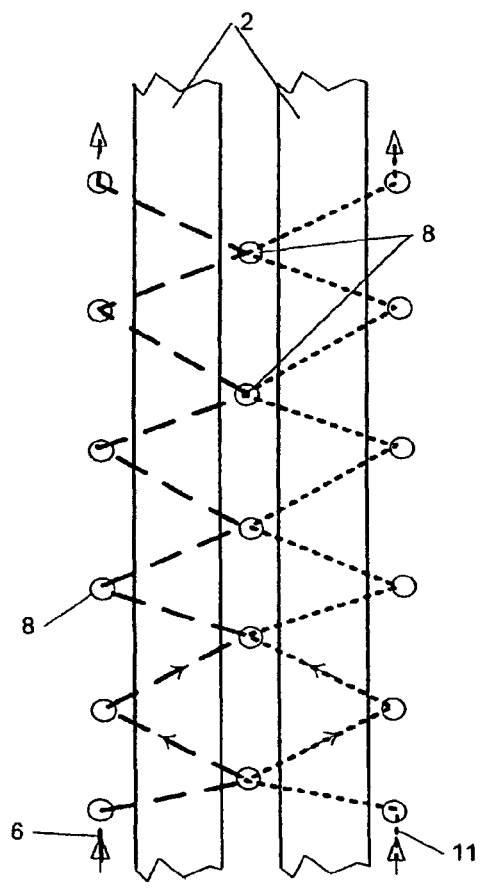
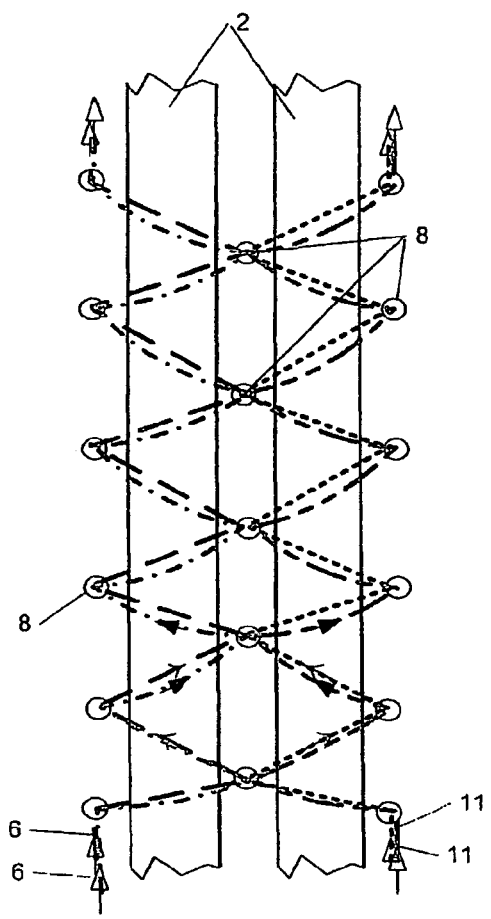
Fig. 8
Fig. 9

FIBRE MAT AND A METHOD OF MANUFACTURING A FIBRE MAT

The invention relates to a method of manufacturing a fibre mat adapted for use in the manufacture of a fibre-reinforced device, said fibre mat comprising at least two essentially longitudinally extending and parallel batches of fibres optionally in combination with one or more carrier layers and holder means such as thread or the like. The invention further relates to a fibre mat and use of a fibre mat.

It is commonly known to use fibre mats consisting of unidirectional batches of fibres for constructing laminates for various fibre-reinforced plastics objects, including ia large objects, eg blades for wind energy plants, for use in the boat industry, the airplane industry, the car industry or for structural elements.

The batches may be secured to subjacent layers of other batches or to a carrier layer of felt by means of stitching by the so-called "Tricot stitching". In popular terms that kind of stitching is described as a zigzag stitching performed with a thread across each of the individual batches of the mat. However, tricot-stitch stitching is associated with the drawback that the fibres are influenced by the stitching and assume a sinus curve-like shape in the longitudinal direction of the fibres with a "swing" for the attachment of each thread to the carrier layer, which is due to pull forces in the thread.

In case of batches of thin fibres, eg carbon fibres with thicknesses of less than 7 μm, the respective batches are strained in such a manner, when stitched with tricot-stitches, that they wind in a distinctly undulating manner in the longitudinal direction. Such undulating batches are entirely undesirable and entail dramatically reduced strength properties in the finished laminate and particularly when it comes to compression strength.

If the strain on the thread is reduced to counter the winding, the effect is that the batches can be compressed to be flat which may result in a protracted and impaired moulding process, as the distribution of resin becomes harder, since the compressed batches may have a blocking effect on the transport of resin in the direction of thickness of the laminate. This may apply when the moulding technique used is the VARTM process (Vacuum Assisted Resin Transfer Moulding). As it is, during this moulding process the relevant resin is sucked into dry layers of fibre mats by means of subatmospheric pressure in the mould. It is therefore very important that the resin is able to flow comparatively unimpeded longitudinally of, transversally to and in depth of the layers.

It is an object of the invention to provide a fibre mat and a method of manufacturing a fibre mat, wherein batches of fibres are joined in a manner by which the batches do not undulate and which hence does not entail a loss of strength in compression. It is also a further object to avoid that batches of fibres can be compressed during moulding and have an impairing effect on the transport of resin.

Other objects will appear from the description.

Novel aspects of the method according to the invention involves that the method comprises joining of the batches by holder means that span each batch at an angle in such a manner that the holder means influence each batch essentially symmetrically about an axis situated longitudinally between the batches. Symmetrical influence about an axis longitudinally between the batches means that influence from one side is matched by an influence from an opposite side. Hereby it is prevented that the batch will undulate; however, due to the symmetrical influence it may be powerful enough to fixate the batch to the effect that it is not compressed to be flat during moulding. Simultaneously the batches remain clearly separated, whereby resin is more readily conveyed longitudinally, transversally and in depth relative to the batches. Without the undulations, the batches are straight and straightened and hence have superior properties in compression.

In two embodiments the holder means may comprise at least one thread which is conveyed in a predetermined pattern above or below, respectively, each of the batches. Hereby the method can be exercised in prior art plants for manufacturing fibre mats, where the manufacturing process comprises stitching. In that embodiment the thread can be configured transversally to the batches in a direction which is essentially perpendicular to the longitudinal direction of the batches. Hereby the influence on the thread on the batches becomes symmetrical about an axis between the batches.

According to a preferred embodiment at least one thread can be conveyed in a pattern that comprises cross-stitches. The cross-stitches can be performed to be symmetrical and hence undo each other's influence on the batches.

According to a preferred embodiment the at least one thread is conveyed in a pattern that comprises stitches that are arranged longitudinally between the batches.

According to a preferred embodiment the fibre mat further comprises at least a first carrier layer onto which the batches are secured by the holder means. When securing of the batches to a carrier layer, the carrier layer assists in keeping the batches together. By using a very thin carrier layer, the drapeability of the joined batches is maintained, while simultaneously the above-referenced advantages are maintained. Moreover, production-technical advantages are accomplished since, when using a subjacent carrier layer, it is necessary to only to make the holder means cross the batches on the top face and not on the bottom face.

According to yet a preferred embodiment the thread can be conveyed in stitches that have a length corresponding to one through ten times the width of a neighbouring batch. Hereby it is accomplished that suitable length is imparted to the stitches and hence also distance between the securing points of the batches onto the carrier layer. Too close stitches will mean that unnecessarily much thread will be used, while too long stitches will mean imprecise securing of the batches.

A further preferred embodiment may comprise that means are provided for handling a number of threads and means for handling a carrier layer and a number of batches of fibres, and wherein the majority of the batches are secured by the steps of:

a) a number of needles, each having a needle eyelet, being at a set of first positions between the batches conveyed through the carrier layer from a side located opposite the batches;
b) at least two threads being seized by each eyelet;
c) the eyelets being closed
d) the needles being pulled through the carrier layer such that the at least two threads form a loop;
e) the eyelets being opened, and the threads being let go;
f) each needle being conveyed through the loop that was formed in step d) of the at least two threads;
g) the needles at a set of offset positions being conveyed through the carrier layer,
h) at least two other threads being seized by the eyelet;
i) the needles being pulled through the carrier layer such that the at least two threads form a loop;

wherein each of the at least two threads are, prior to step b), conveyed from opposite sides above or below a neighbouring batch of fibres. Hereby secure attachment of the batches is accomplished as the threads are fixated against the carrier layer in stitches that are secured through the carrier layer by the loops. Thus the method can be exercised longitudinally of the batches and will hence be suitable for automated exercise since the steps can be performed over and over again for producing fibre mats of very great length.

A further preferred embodiment may comprise that means are provided for handling a number of threads and means for handling a carrier layer and a number of fibre batches, and wherein the majority of the batches are secured in the steps of:

j) a number of needles, each having a needle eyelet, being at a set of first positions between the batches conveyed through the carrier layer from a side located opposite the batches;

k) at least two threads being seized by each eyelet;

l) the eyelets being closed m) the needles being pulled through the carrier layer such that the at least two threads form a loop;

n) the eyelets being opened, and the threads being let go;

o) each needle being conveyed through the loop that was formed in step m) of the at least two threads;

p) the needles at a set of offset positions on the container layer being conveyed through the carrier layer, q) at least one thread being seized by the eyelet;

r) the needles being pulled through the carrier layer such that the at least one thread forms a loop;

wherein each of the at least two threads are, prior to step k), conveyed in a pre-determined pattern, including from opposite sides above or below, respectively, a neighbouring batch of fibres and longitudinally between a first and a second neighbouring batch. Thus the method can be exercised longitudinally of the batches and will moreover be suitable for automated exercise as the steps can be repeated over and over again for producing fibre mats of very great length. By this embodiment it is further accomplished that stitches can also be arranged longitudinally of the batches, and that not all of the threads are used to form all of the loops, whereby savings can be accomplished on the amount of threads.

By yet a further preferred embodiment the holder means may comprise a second carrier layer that is secured to the first carrier layer by at least three joints or rows of joints extending in parallel, whereby the first and the second carrier layer with the joints form a number of ducts in which the batches are arranged. Hereby the first and the second carrier layer may cooperate for precise enclosure of the batches of fibres that are hence not allowed to undulate. Moreover it is ensured that resin can easily be conveyed in the area between two neighbouring ducts.

By a specific embodiment the joints or rows of joints can be formed by a process selected from a group comprising stitching, gluing and welding. These processes are easy to exercise and simultaneously provide reliable functioning. When the joints are made in rows, there may be distance between joints longitudinally of the batches, whereby resin is also allowed to be more easily conveyed transversally of the batches between the joints.

According to a convenient embodiment the first carrier layer may be selected from a group comprising a material which is permeable to resin, including in the form of fibres disposed diagonally or transversely relative to batches of fibres, a non-woven material, braided fibres and woven fibres, including glass fibres.

According to yet a preferred embodiment the threads can be conveyed with a tensile force which is adapted such that a rounded contour is imparted to the batches in the transverse direction. Hereby it is ensured that there is ample space for conveyance of resin between neighbouring batches.

According to a further preferred embodiment the amount of fibres in the batches can be adapted in relation to the size of the ducts whereby a rounded contour is imparted to the batches in the transverse direction. Hereby in this embodiment, too, ample space is provided for conveying resin between neighbouring batches.

According to a convenient embodiment the batches may comprise fibres selected from a group comprising glass fibres, carbon fibres, fibres that have less electrical resistance than glass fibres, and combinations of fibres of various materials.

Novel aspects of a fibre mat according to the invention involves that it is adapted for use in the manufacture of a fibre-reinforced device and comprises at least two essentially longitudinally extending and parallel batches of fibres, wherein the batches are joined by holder means that span each batch at an angle to the effect that each batch is influenced, which influence is essentially symmetrical about an axis situated longitudinally between the batches. A symmetrical influence about an axis longitudinally between the bathes accomplishes that a influence from one side is matched by an influence from an opposite side. Hereby it is thus prevented that the batches will undulate. It is moreover accomplished that the batches can be fixated tightly so as to prevent them from being compressed to be flat during moulding. Simultaneously the batches are clearly separated, whereby resin is more easily conducted in the transverse direction, longitudinally and in depth of the batches. Without the undulations the batches are straight and straightened and hence have superior properties in compression.

Convenient embodiments of the fibre mat will appear from claims 17-26.

A fibre mat according to one or more of claims 16-26 can advantageously be used in RTM moulding of a fibre-reinforced device or VARTM, hand laying or prepeg (wet or dry), respectively. Precisely by a VARTM moulding the improved property with regard to conductivity is particularly advantageous.

According to a particularly advantageous embodiment the above-reference fibre mats can be used in the moulding of a device which is configured to partake in a blade for a wind energy plant, including eg a blade shell or a reinforcing beam. Such blades have very great length and a portion of fibres is often arranged so as to extend throughout the entire blade length. Thereby the improved property with regard to conductivity of resin is particularly advantageous. Also the improved properties in compression have great value, since both sides of a blade can be exposed to large loads that entail compression.

Now follows a more detailed description of the invention given with reference to figures that exemplify embodiments of the invention:

FIGS. 6-12 are schematic views of conveyance of one or more, respectively, threads in different patterns.

Figure 1:
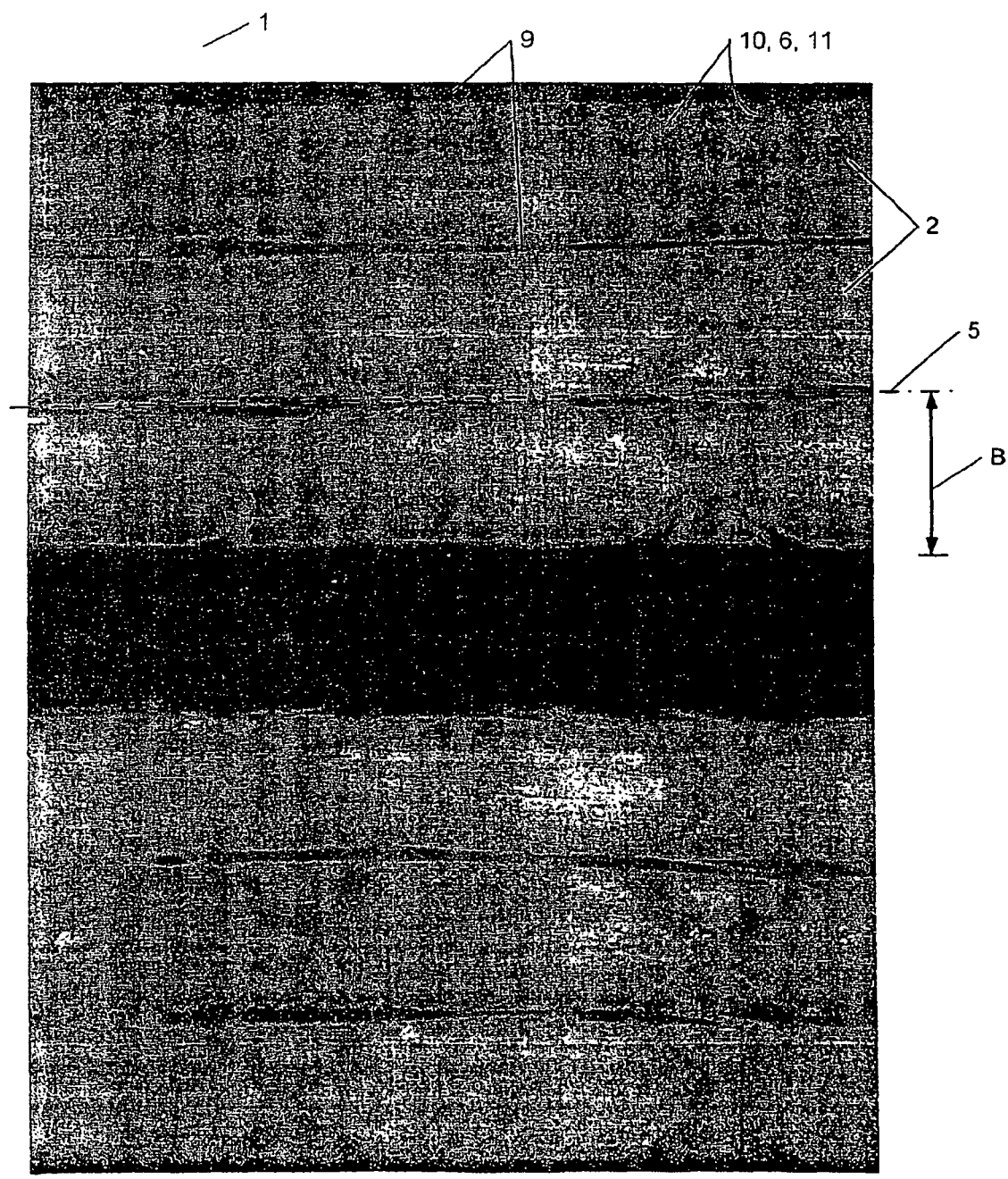
FIG. 1 is a sectional view, seen from above, of a fibre mat according to the invention.

FIG. 1 shows a fibre mat 1 comprising a number of batches of fibres 2 that are secured to a non-visible carrier layer 3. Holder means in the form of threads 6 and 11 keep the batches securely attached to the non-visible carrier layer. Threads 6 and 11 are conveyed in a manner to comprise cross-stitches 10 and straight stitches 9 that are arranged in parallel with batches 2. Stitches 10 influence the batches 2 symmetrically about an axis 5 longitudinally between the batches as taught in the figure. Each batch 2 has a width B, but may also have other widths and, likewise, there may be different types of fibres from one batch to another and within individual batches. Thus there may be batches that comprise glass fibres and carbon fibres admixed in a fixed ratio.

Figure 2:
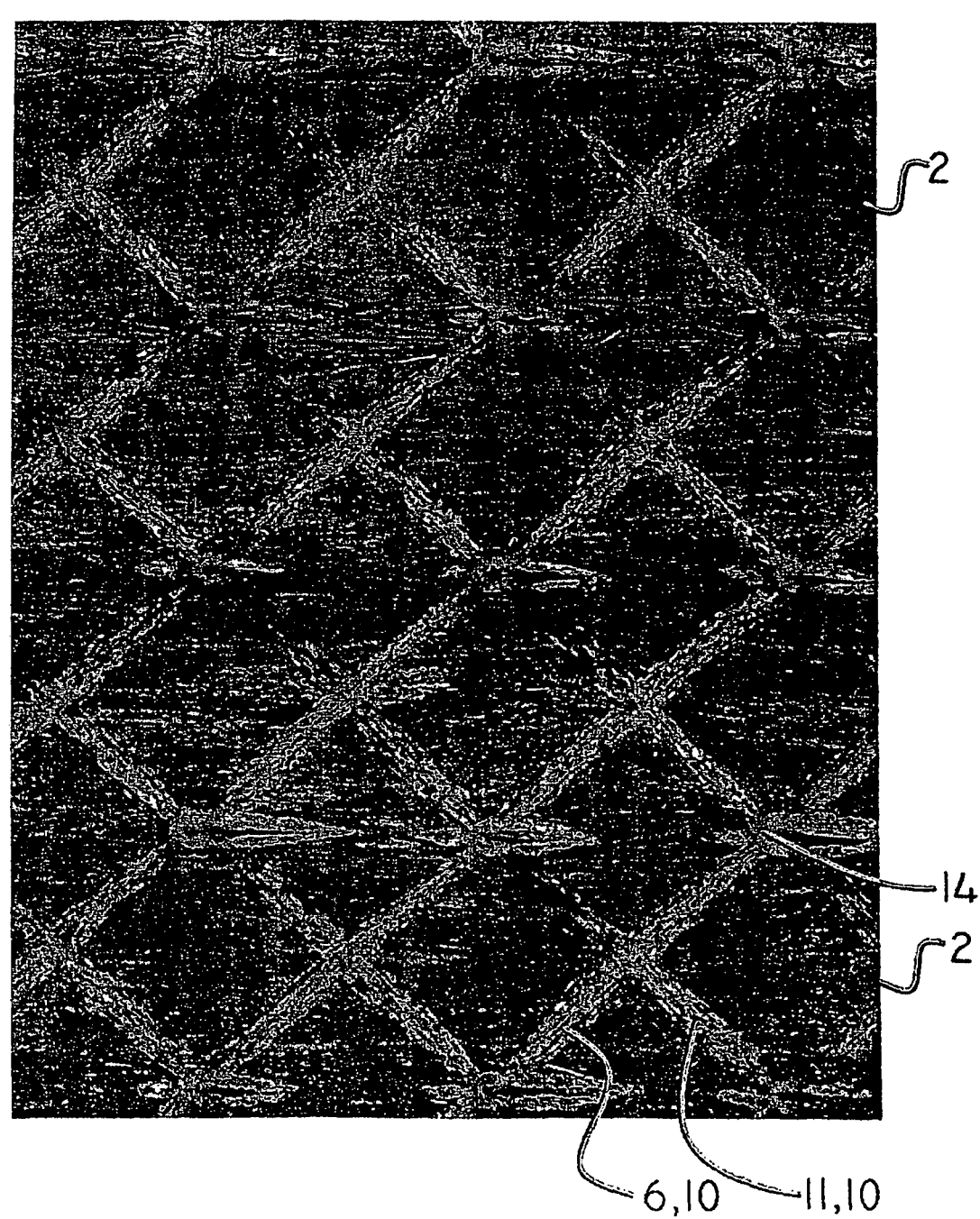
FIG. 2 is a sectional view, seen from above, of an alternative configuration of a fibre mat according to the invention.

FIG. 2 shows a fibre mat 1 comprising a number of batches of fibres 2 that are secured to a non-visible carrier layer 3. Holder means in the form of threads 6 and 11 keep the batches 2 securely to the non-visible carrier layer. Threads 6 and 11 are conveyed in a manner that comprises cross-stitches 10. The stitches influence the batches 2 symmetrically about a non-shown axis longitudinally between the batches, thereby avoiding that the batches 2 undulate. A corresponding axis of symmetry will appear from FIG. 1. Between batches 2, individual loops 14 will appear that fixate the stitches 10.

Figure 3:
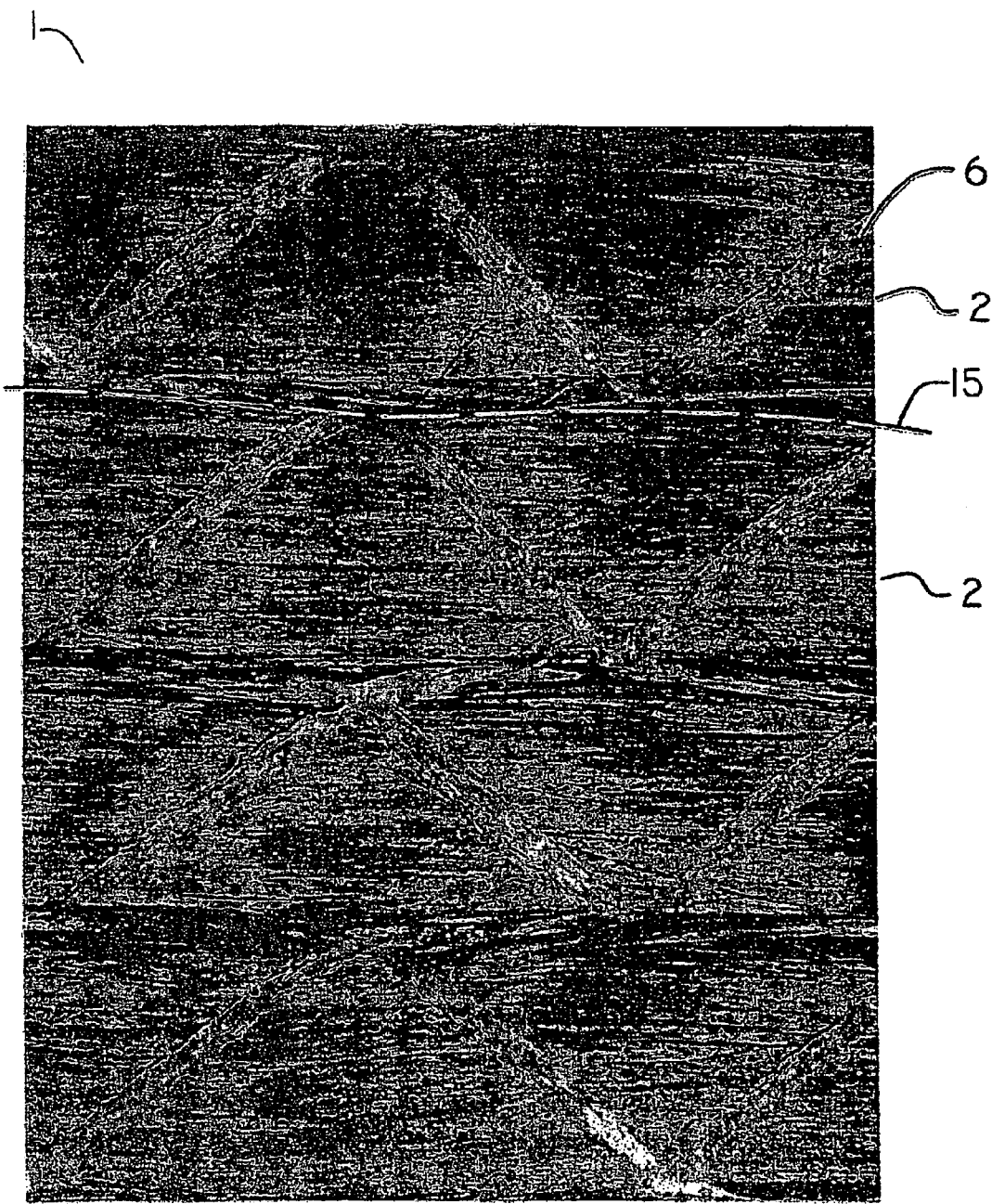
FIG. 3 is a sectional view, seen from above, of a prior art fibre mat.

FIG. 3 shows a prior art fibre mat 1 with batches 2 of fibres. By means of a thread 6, the batches 2 are fixated by tricot-stitches that extend in a zigzag-like pattern and not symmetrical about any axis longitudinally of the batches. An incorporated curve 15 underlines how the batches 2 wind, which is, as mentioned previously, undesired.

Figure 4:
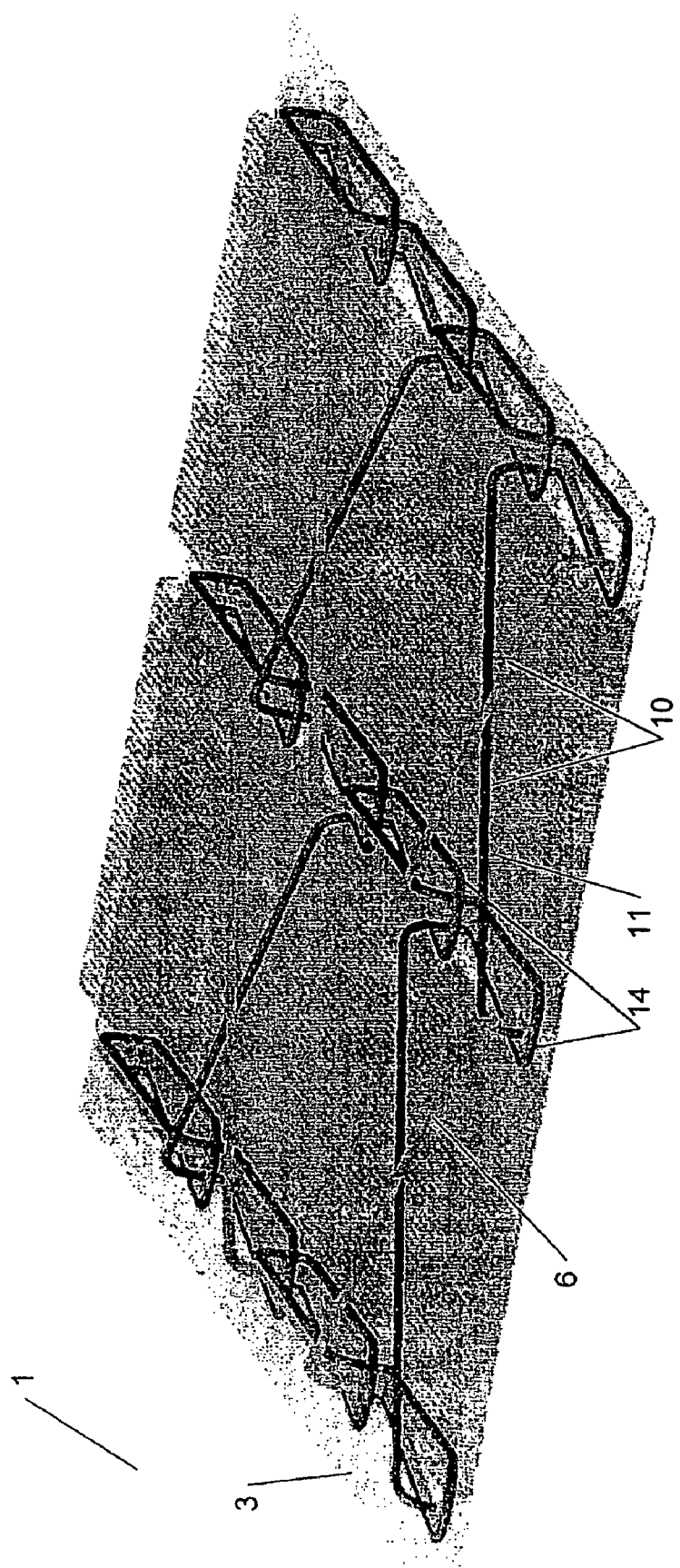
FIG. 4 is a schematic view of conveyance of two threads in a pattern.
Figure 11:
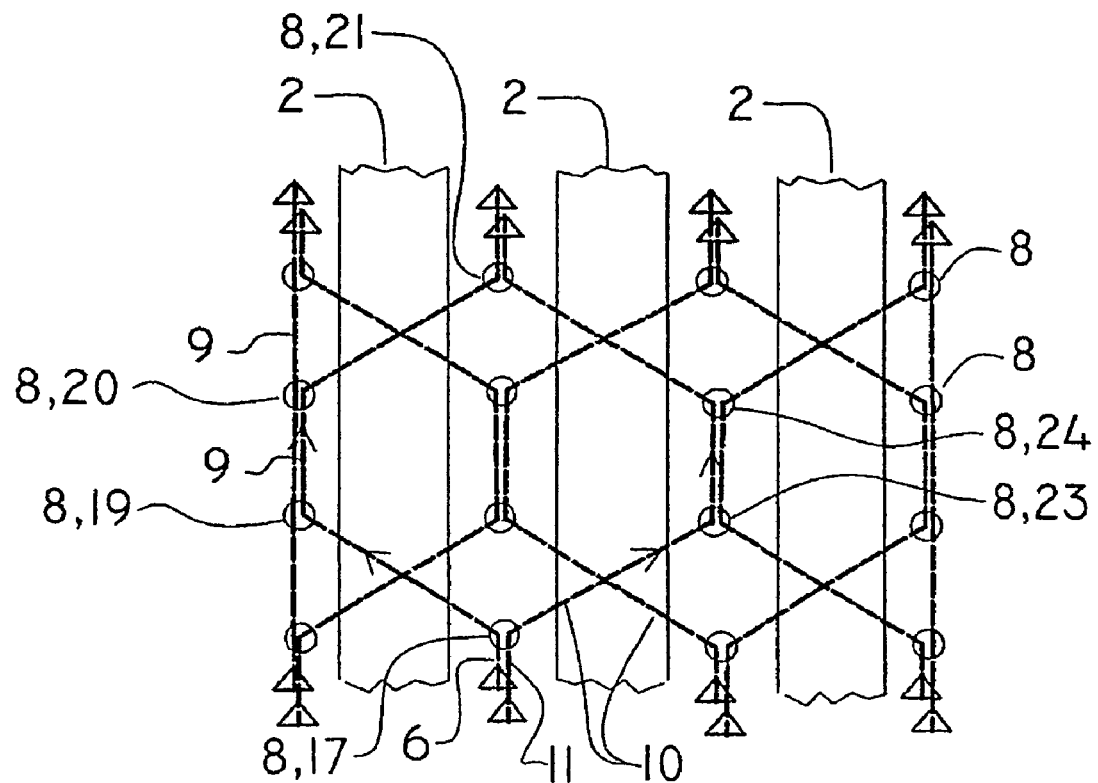

FIG. 4 shows a fibre mat 1 that comprises a carrier layer 3 which is merely outlined and depicted transparently. Batches of fibres are not shown. Threads 6 and 11 are conveyed in a manner that comprises cross-stitches 10. Moreover, the FIG. shows that the threads 6, 11 are pulled as one down into a loop 14 that is to be perceived as being arranged on one side of the carrier layer 3, while stitches 10 are arranged on the opposite side of the carrier layer 3. A corresponding embodiment is shown in FIG. 11. The not shown batches are arranged between carrier layer 3 and stitches 10. Conveyance of the threads 6 and 11 takes place in that a not shown needle having an eyelet being, at a first position between the not shown batches, conveyed through the carrier layer 3 from a side which is arranged opposite the batches, and two threads 6, 11 are seized by each eyelet, following which the eyelet is closed and the threads are secured in the eyelet. Then the needle is pulled through the carrier layer 3, whereby the two threads 6, 11 form a loop 14, following which the eye is opened and the threads are let go. Then the needle is conveyed through the loop 14 it has formed of the two threads 6, 11 that were made before, following which the needle is yet again, in an offset position of the carrier layer 3, conveyed there through and other two threads are seized by the eyelet and pulled through the carrier layer, whereby they form a new loop, etc. The threads are thus conveyed in a manner so as influence the not shown batches symmetrically by the threads and hence they will not undulate.

Figure 5:
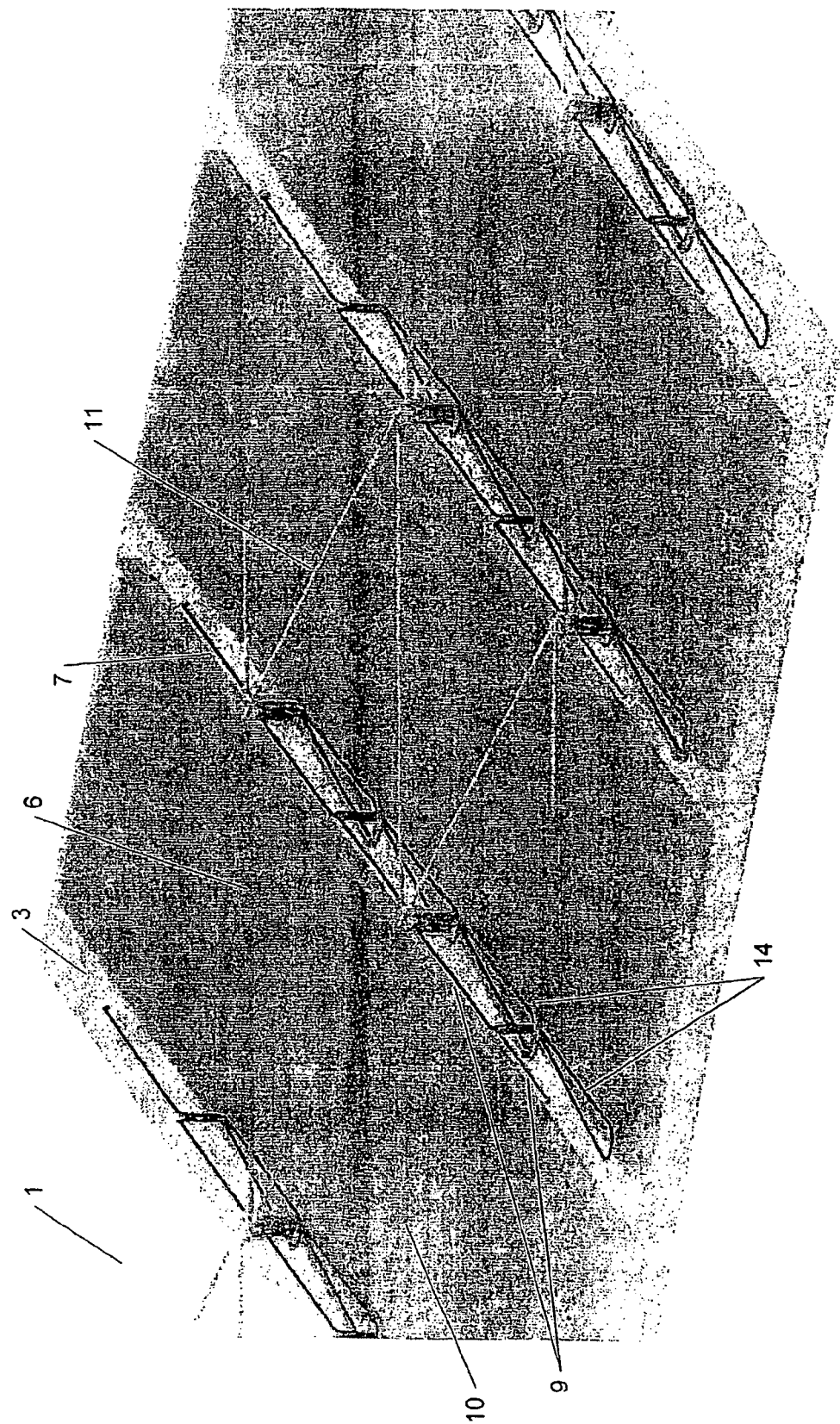
FIG. 5 is a schematic view of conveyance of three threads in a pattern.
Figure 12:
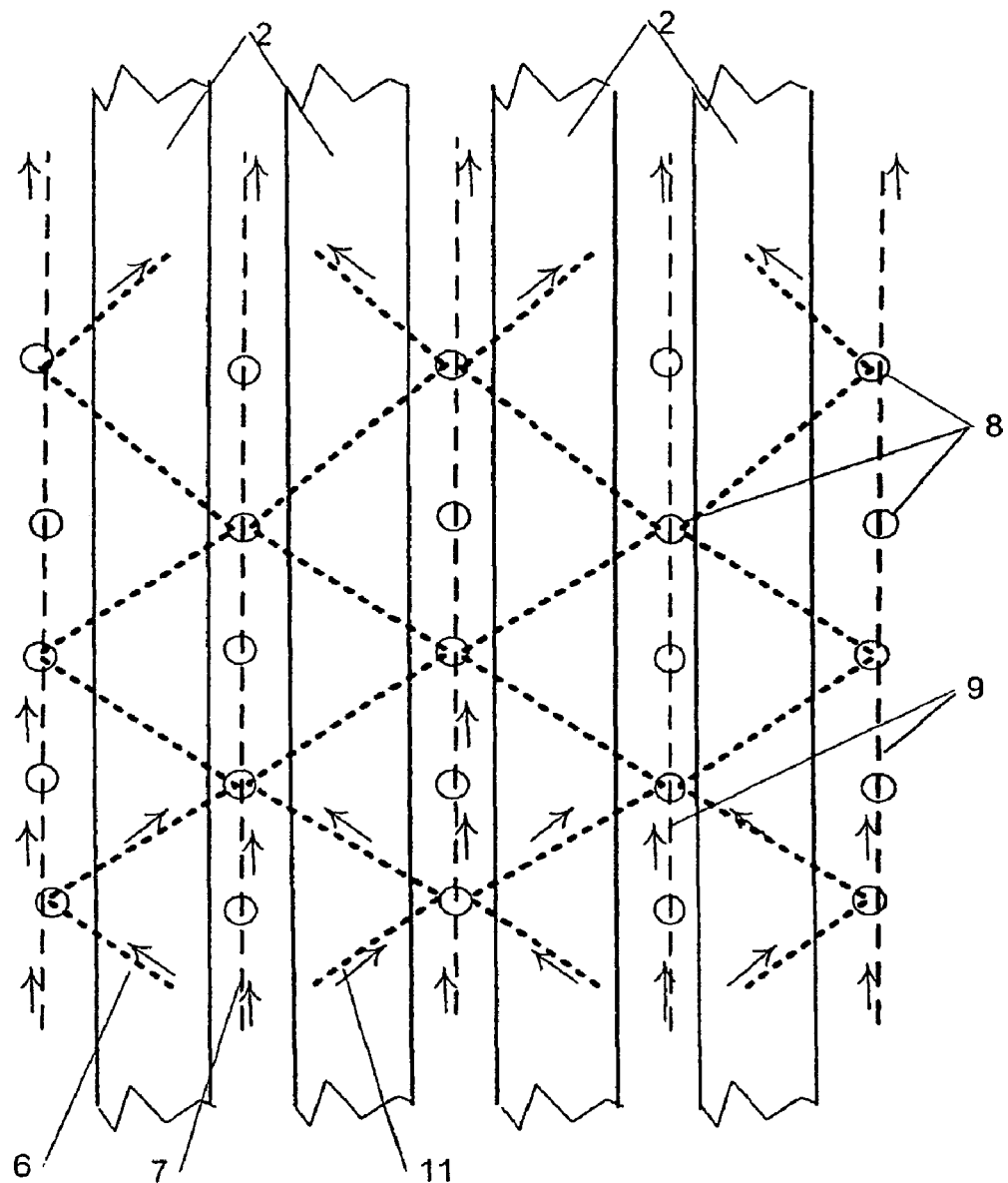

FIG. 5 also shows a fibre mat 1 that also comprises a carrier layer 3 which is merely outlined and depicted transparently. Batches of fibres are not shown. That stitching comprises conveyance of three threads 6, 7 and 11 that are conveyed in a manner to comprise both transversal and longitudinal stitches 9 and 10. Moreover, the FIG. also shows the thread 7 alone and threads 6, 7 and 11 together, respectively, that are pulled down into a loop 14 that is to be perceived as being arranged on a side of the carrier layer 3, while stitches 9 and 10 are located on the opposite side of the carrier layer 3. A corresponding embodiment is shown in FIG. 12. The not shown batches are arranged between the carrier layer 3 and stitches 9 and 10. The conveyance of the threads 6, 7 and 11 take place by a not shown needle with an eyelet being, in a first position between the not shown batches, conveyed through the carrier layer 3 from a side arranged opposite the batches, and three threads 6, 7, 11 are seized by each eyelet, following which the eyelet is closed, and the threads are secured in the eyelet. Then the needle is pulled through the carrier layer 3, whereby the three threads 6, 7 and 11 form a loop 14, following which the eye is opened and the threads are let go. Then the needle is conveyed through the loop 14 that it formed on by the three threads 6, 7, 11 that were formed before, following which the needle is, in an offset position of the carrier layer 3, again conveyed there through, and the one thread 7 is seized by the eyelet and pulled through the carrier layer, whereby it forms a new loop, etc. The threads are hereby conveyed in a manner as to influence the not shown batches symmetrically by the threads and hence they will not undulate.

FIGS. 6-12 show embodiments that comprise examples of how threads according to the invention can be conveyed so as to influence one or more batches of fibres symmetrically. The carrier layer is not shown in FIGS. 6-8 and 10-12. Instead circles 8 indicate points of passage for threads wherein one and more needles, respectively, is/are conveyed through the not shown carrier layer and have pulled the thread or threads down through the carrier layer, where a not shown loop is then formed. A loop will appear from FIG. 4 and FIG. 5. The needles are then taken through that loop and in an offset position it is/they are again conveyed up through the carrier layer and has pulled at least one thread downwards along and formed a new loop, etc. For the sake of overview, carrier layer 3 and loop 14 are not shown in FIGS. 6-8 and 10-12. The outlined joining of batches in FIG. 9 is without a carrier layer and there circles indicate where one and more needles, respectively, were conveyed onto the other side of the batches.

Figure 6:
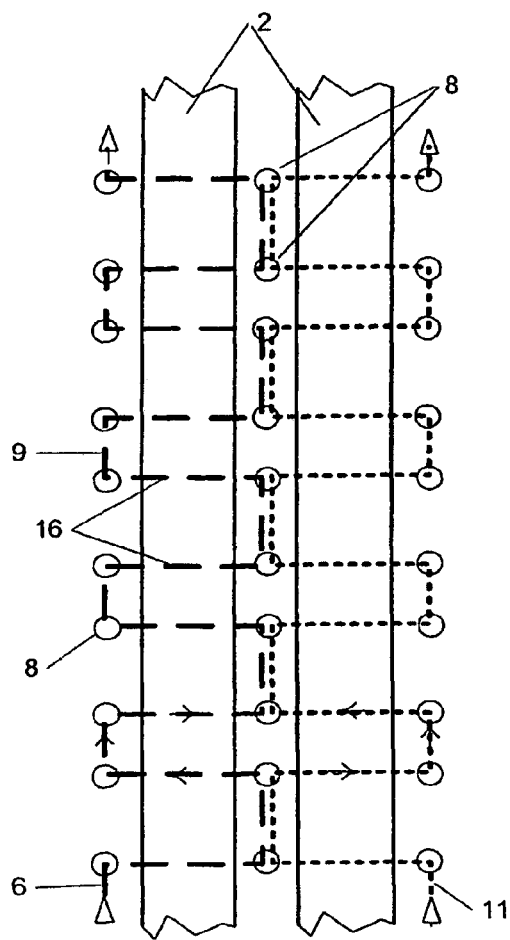

In FIG. 6 two threads 6 and 11 are conveyed in stitches that extend perpendicular to the longitudinal direction of the batches 2 and longitudinally thereto, respectively, see stitches designated 16 and 9. In this context, a stitch is to be seen as the thread which is found between two successive points of passage indicated by circles 8.

Figure 7:
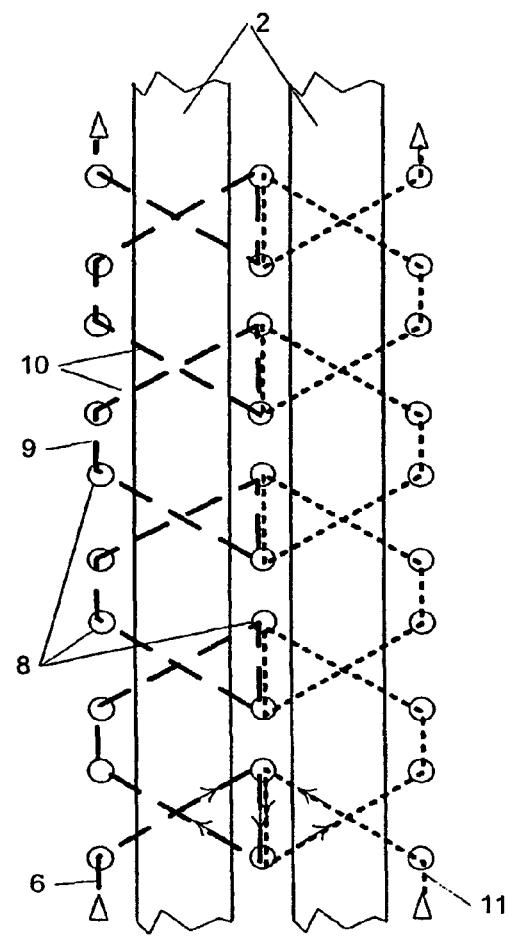

In FIG. 7 two threads 6 and 11 are conveyed in stitches that comprise straight stitches 9 and cross-stitches 10.

In FIG. 8 two threads 6 and 11 are conveyed in stitches that only comprise transversal stitches.

FIG. 9 schematically shows a joining of two batches without a carrier layer, wherein the four threads 6 and 11 are conveyed in transversal stitches above as well as below the batches, whereby the threads influence each batch symmetrically about an axis longitudinally of the batches.

Figure 10:
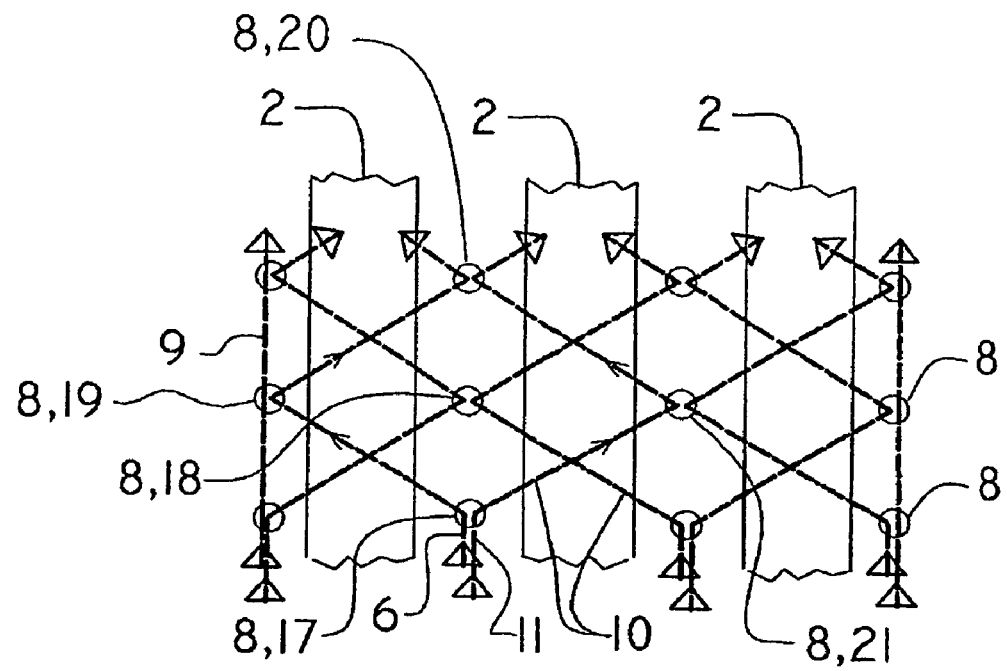

FIG. 10 shows conveyance of two threads 6 and 11. In case of three batches 2 eight threads can be used, but six will suffice, since the outermost ones are alone taken in straight stitches 9 that do not assist in securing the batches 2. Threads 6 and 11 are conveyed through a point of passage 8 in a first position 17. The threads are than taken diagonally in each their direction in the form of cross-stitches 10 and towards positions 19 and 21, respectively, following which they are yet again brought together at position 20. Seen longitudinally of the batches 2, position 18 is the next one seen in relation to position 17; however, at position 18 two other threads are brought together, yet preferably with the same set of not shown needles. Hereby a not shown loop of threads 6 and 11 is made by the threads that were joined at position 18 and again at position 20. The not shown loops are thus caused to be situated longitudinally between positions 17 and 18 as well as 18 and 20.

FIG. 11 shows another way of conveying threads. In principle the difference compared to FIG. 10 is that cross stitches 10 are arranged at intervals that were created by a set of cross-stitches 10 being replaced by a set of straight stitches 9. The threads 6 and 11 are conveyed through a point of passage 8 at a first position 17. The threads are then conveyed diagonally in each their direction in the form of cross-stitches 10 towards positions 19 and 23, respectively, following which they are conveyed in straight stitches towards position 20 and 24, respectively, following which they are assembled again at position 21. Hereby a not shown loop of threads 6 and 11 is made by means of the threads that were brought together at position 18 and again at position 20. By this embodiment a more flexible mat design is accomplished that is more easily smoothened on a curved or double-curved mould surface, eg in connection with VARTM-moulding.

FIG. 12 shows a way of conveying three threads. In principle, the difference over FIGS. 10 and 11 is that a third thread 7 is conveyed only essentially in stitches 9 longitudinally between the batches. The not shown loops are formed as shown in FIG. 5 from alternatingly one thread 7 and three threads 6, 7 and 11. By that embodiment a more drapeable mat is accomplished that is more easily smoothened on a curved or double-curved mould surface, eg in connection with VARTM-moulding.

In the embodiments shown in FIGS. 10-12 the not shown needles are preferably kept on the same location, while the threads are displaced laterally, and the various positions longitudinally of the batches 2 are achieved by displacement of batches 2, including the not shown carrier layer. The opposite is also possible, but hardly as practical. In practice, of course, the examples shown in FIGS. 6-12 will comprise far more batches 2, since the width B of batches 2 may typically be a few millimetres. In that case more threads, of course, need to be used, but the same fundamental principles are applied.

Figure 13:
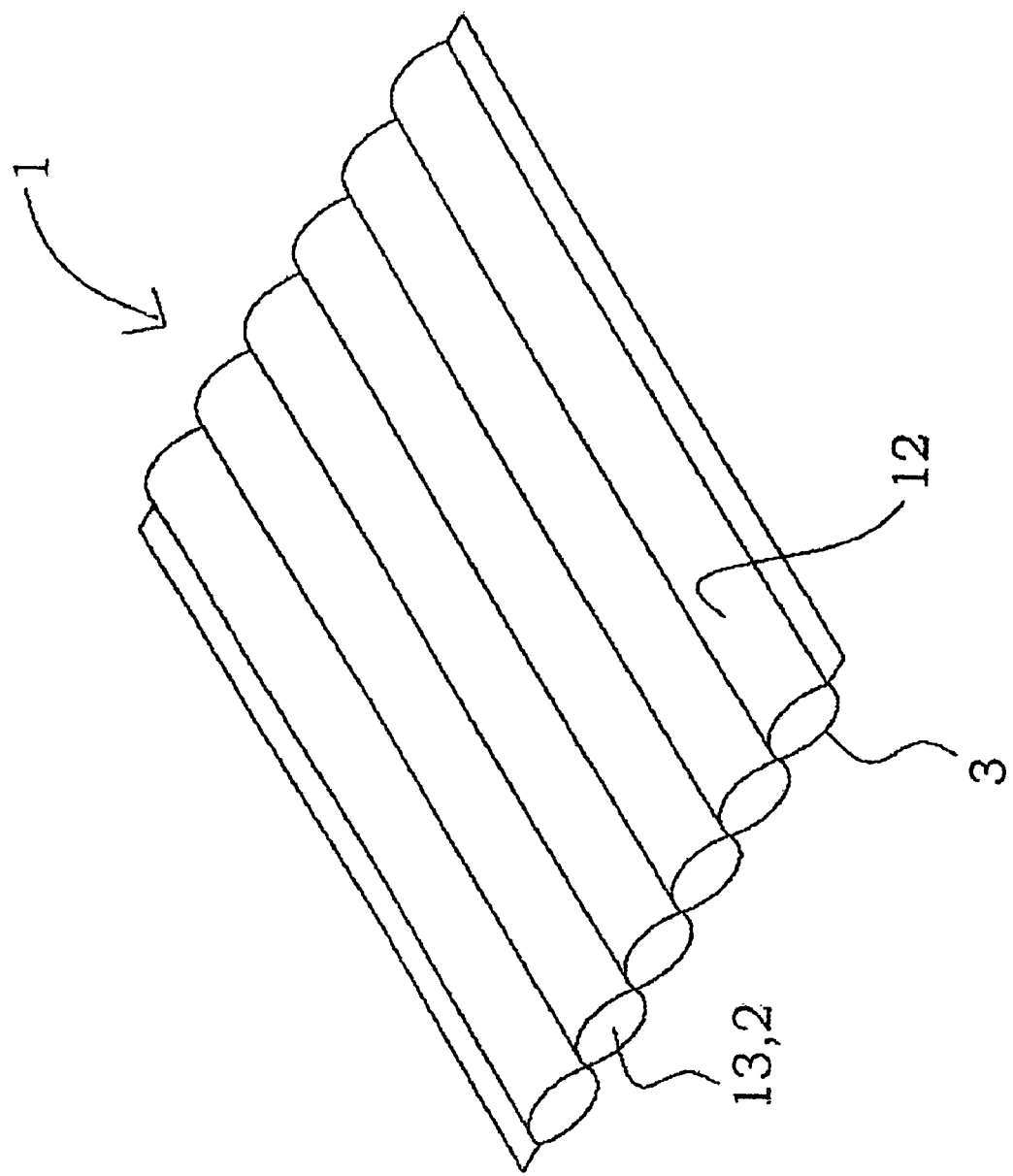
FIG. 13 show a further embodiment of a fibre mat according to the invention, seen under an inclined angle in a front view; sideways, and from above.

FIG. 13 shows an embodiment of a fibre mat 1 that comprises a first carrier layer 3 and a second carrier layer 12 that are joined for producing a number of ducts 13 in which batches 2 of fibres can be arranged. Carrier layers 3, 12 can be joined continuously or in rows of joints, ie eg with a distance between the joints. The joints can be made eg by stitching, gluing or welding. The carrier layers 3, 12 are preferably made of a material which is permeable to resin, a non-woven material, braided fibres or woven fibres, including glass fibres.

It will be understood that the invention as taught in the present description and figures can be modified or changed, while continuing to be comprised by the protective scope of the following patent claims.

The invention claimed is:

1. A method of manufacturing a fibre mat adapted for use in the manufacture of a fibre-reinforced device, said fibre mat comprising at least two essentially longitudinally extending and parallel batches of fibres, wherein the method comprises joining the batches by holder means spanning each batch at an angle in such a manner that the holder means influences each batch (1) essentially symmetrically about an axis situated longitudinally between the batches and (2) essentially symmetrically about an axis spanning the batches at an angle perpendicular to the longitudinal axis.

2. A method according to claim 1, wherein the holder means comprise at least one thread; and wherein the method comprises conveying the at least one thread in a predetermined pattern above at least one of the batches.

3. A method according to claim 2, wherein the method comprises conveying the at least one thread in a pattern that comprises cross-stitches.

4. A method according to claim 2, wherein the method comprises conveying the at least one thread in a pattern that comprises stitches to be arranged longitudinally between the batches.

5. A method according to claim 2, wherein the method comprises conveying the thread in stitches that have a length corresponding to one through ten times the width of a neighbouring batch.

6. A method according to claim 2, providing means for handling a number of threads and means for handling a carrier layer and a number of fibres; and wherein the method comprises securing the major part of the batches by the steps of:
   a) conveying a number of needles, each having a needle eyelet, being at a set of first positions between the batches through the carrier layer from a side located opposite the batches;
   b) seizing at least two threads by each eyelet;
   c) closing the eyelets;
   d) pulling the needles through the carrier layer such that the at least two threads form a loop;
   e) opening the eyelets and letting go of the threads;
   f) conveying each needle through the loop that was formed in step d) of the at least two threads;
   g) conveying the needles at a set of offset positions through the carrier layer;
   h) seizing at least two other threads by the eyelet;
   i) pulling the needles through the carrier layer such that the at least two threads form a loop;
   wherein the method comprises conveying each of the at least two threads, prior to step b), from opposite sides above or below a neighbouring batch of fibres.

7. A method according to claim 2, providing means for handling a number of threads and means for handling a carrier layer and a number of fibre batches, and wherein the method comprises securing the majority of the batches in the steps of:
   j) conveying a number of needles, each having a needle eyelet, being at a set of first positions between the batches through the carrier layer from a side located opposite the batches;
   k) seizing at least two threads by each eyelet;
   l) closing the eyelets
   m) pulling the needles through the carrier layer such that the at least two threads form a loop;
   n) opening the eyelets, and letting go of the threads;
   o) conveying each needle through the loop that was formed in step m) of the at least two threads;
   p) conveying the needles at a set of offset positions on the carrier layer through the carrier layer;
   q) seizing at least one thread by the eyelet;
   r) pulling the needles through the carrier layer such that the at least one thread forms a loop;
wherein the method comprises conveying each of the at least two threads prior to step k), in a pre-determined pattern, including preferably from opposite sides above or below, respectively, a neighbouring batch of fibres and longitudinally between a first and a second neighbouring batch.

8. A method according to claim 1, wherein the holder means comprise at least one thread; and wherein the method comprises conveying the at least one thread in a predetermined pattern below at least one of the batches.

9. A method according to claim 1, wherein the fibre mat further comprises at least one further carrier layer; and wherein the method comprises securing the batches to the carrier layer with the holder means.

10. A method according to claim 9, wherein the holder means comprise a second carrier layer; and wherein the method comprises securing the holder means to the first carrier layer by at least three joints or rows of joints that extend in parallel, whereby the first and second carrier layers with the joints is forming a number of ducts in which the batches are arranged.

11. A method according to claim 10, wherein the method comprises configuring the joints or rows of joints by a process selected from a group comprising stitching, gluing and welding.

12. A method according to claim 10, wherein the method comprises adapting the amount of fibres in the batches in relation to the size of the ducts to the effect that a rounded contour is imparted to the batches in the transverse direction.

13. A method according to claim 9, wherein the method comprises selecting the first carrier layer from a group comprising a material which is permeable to resin, including in the form of fibres placed diagonally or transversally in relation to batches of fibres, a non-woven material, braided fibres and woven fibres, including glass fibres.

14. A method according to claim 1, wherein the method comprises conveying the threads with a tensile force adapted such that a rounded contour is imparted to the batches in the transverse direction.

15. A method according to claim 1, wherein the batches comprise fibres; and wherein the method comprises selecting the fibres from among a group comprising glass fibres, carbon fibres, fibres that possess less electrical resistance than glass fibres, and combinations of fibres of different materials.

16. A fibre mat adapted for use in the manufacture of a fibre-reinforced device, which fibre mat comprises at least two essentially longitudinally extending and parallel batches of fibres, where the batches are joined by holder means that span each batch at an angle, whereby an influence is imparted to each batch, said influence being (1) essentially symmetrical about an axis situated longitudinally between the batches and (2) essentially symmetrical about an axis spanning the batches at an angle perpendicular to the longitudinal axis.

17. A fibre mat according to claim 16, wherein the holder means comprise at least one thread which is conveyed in a predetermined pattern above at least one of the batches.

18. A fibre mat according to claim 17, wherein the at least one thread is conveyed in a pattern that comprises cross-stitches.

19. A fibre mat according to claim 17, wherein the at least one thread is conveyed in a pattern that comprises stitches that are arranged longitudinally between the batches.

20. A fibre mat according to claim 17, wherein the thread is conveyed in stitches that have a length corresponding to one through ten times the width of a neighbouring batch.

21. A fibre mat according to claim 16, wherein the holder means comprise at least one thread which is conveyed in a predetermined pattern below at least one of the batches.

22. A fibre mat according to claim 16, wherein the fibre mat further comprises at least a first carrier layer; and comprises that the batches are secured to the carrier layer by the holder means.

23. A fibre mat according to claim 16, wherein the holder means comprises a second carrier layer which is secured to the first carrier layer by at least three joints or rows of joints that extend in parallel, whereby the first and the second carrier layer with the joints form a number of ducts in which the batches are arranged.

24. A fibre mat according to claim 23, wherein the joints or rows of joints are configured in a process selected from a group comprising stitching, gluing and welding.

25. A fibre mat according to claim 16, wherein the first carrier layer is selected from a group comprising a material which is permeable to resin, including in the form of fibres arranged diagonally or transversally in relation to batches of fibres, a non-woven material, braided fibres and woven fibres, including glass fibres.

26. A fibre mat according to claim 16, wherein the batches comprise fibres selected from a group comprising glass fibres, carbon fibres, fibres that possess less electrical resistance than glass fibres and combinations of fibres of various materials.

27. Use of a fibre mat according to claim 16, wherein the use comprises VARTM moulding of a fibre-reinforced device.

28. Use according to claim 27, wherein a device is moulded that is configured for being a constituent in/of a blade for a wind energy plant.

* * * * *